United States Patent [19]

Whitham

[11] Patent Number: 4,878,695
[45] Date of Patent: Nov. 7, 1989

[54] EXPANDING RING JOINT

[75] Inventor: Kent G. Whitham, Inyokern, Calif.

[73] Assignee: The United States of America as Represented by the Secretary of the Navy, Washington, D.C.

[21] Appl. No.: 280,056

[22] Filed: Dec. 5, 1988

[51] Int. Cl.⁴ .............................................. F16L 35/00
[52] U.S. Cl. ........................................ 285/39; 285/81; 285/90; 285/401; 285/404; 285/290; 403/348; 29/525.1
[58] Field of Search ............... 285/399, 401, 404, 400, 285/391, 376, 377, 360, 362, 81, 90, 39, 915, 290; 403/348, 349; 29/525.1

[56] References Cited

U.S. PATENT DOCUMENTS

| 736,624 | 8/1903 | Pitkethly et al. | 285/358 |
| 771,388 | 10/1904 | Nusbaum | 285/152 |
| 2,198,922 | 4/1940 | Shaw | 285/362 |
| 2,422,223 | 6/1947 | Church | 285/81 X |
| 2,599,222 | 6/1952 | Bergquist | 287/58 |
| 3,051,514 | 8/1962 | Consolloy | 285/215 |
| 3,101,925 | 8/1963 | D Ziallas et al. | 285/81 X |
| 3,301,567 | 1/1967 | Barr | 285/360 X |
| 3,384,393 | 5/1968 | Horton | 285/158 |
| 3,751,078 | 8/1973 | O'Brian et al. | 285/362 X |
| 4,407,603 | 10/1980 | Lundgren | 403/370 |
| 4,491,060 | 6/1983 | Boski | 92/128 |

Primary Examiner—Dave W. Arola
Attorney, Agent, or Firm—William C. Townsend; Melvin J. Sliwka; Harvey A. Gilbert

[57] ABSTRACT

A joint having no external protrusions consisting of the mating cylindrical ends of two tubular members joined by interlocking cogs on the male and female ends of the tubular members, and a pair of facing ramp surfaced rings disposed in the joint with one ring integral with or affixed immovably to the male end of one tubular member, the other ring rotatably disposed upon that same member within the joint so that when the movable ring is rotated by means of a spanner wrench or equivalent tool relative to the stationary ring, the juxtaposed ramp surfaces ride upon each other causing the movable ring to move axially relative to but in continuing contact with the stationary ring until contact with the female end of the other tubular member in the joint is established and the joint is thereby made rigid. The spaces thus created between the ramps of the rings are filled with material that becomes solid or set screws radially disposed in the movable ring to engage an annular slot about the male end of the one tubular member and underlying the movable ring can be used to thereafter immobilize that ring.

13 Claims, 2 Drawing Sheets

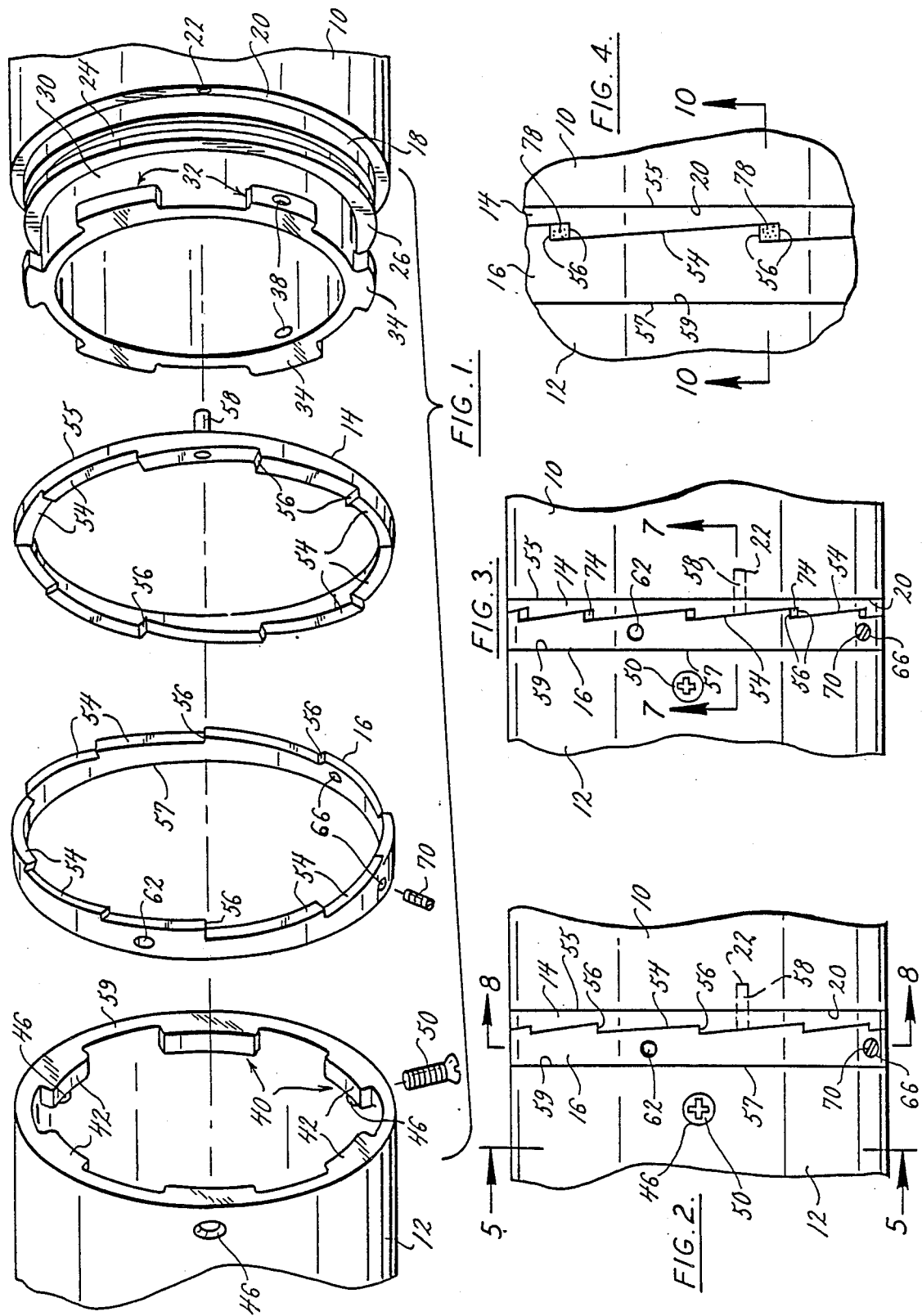

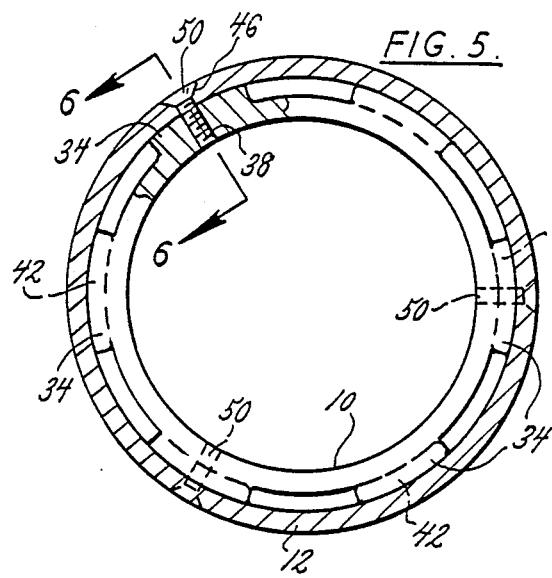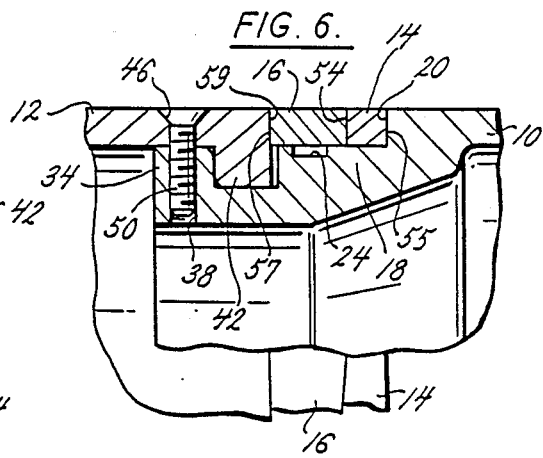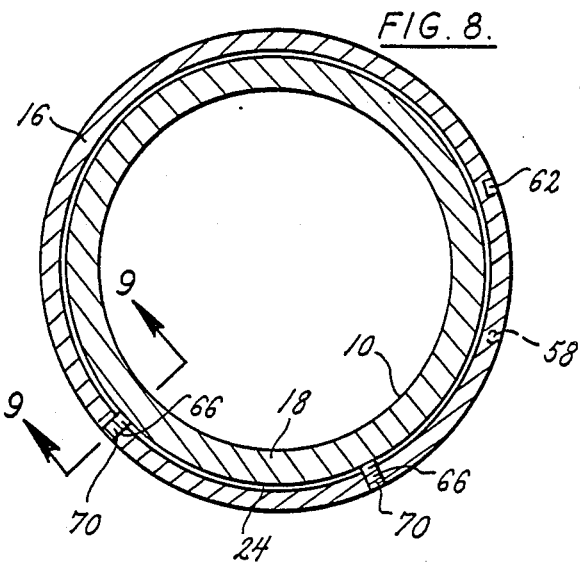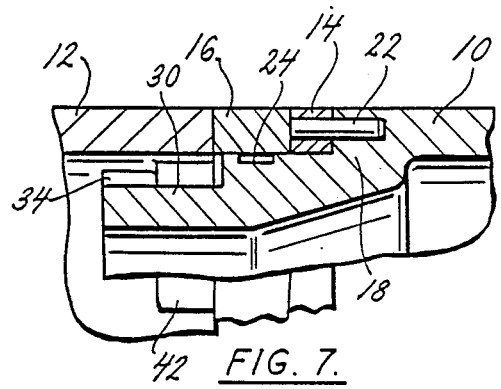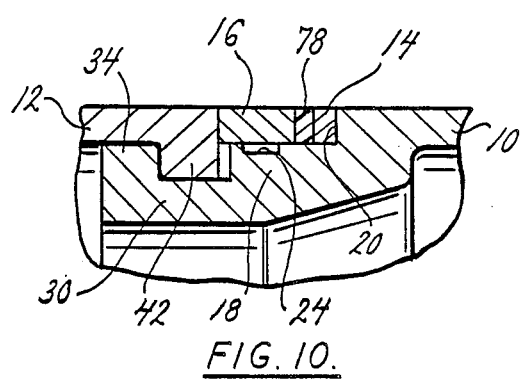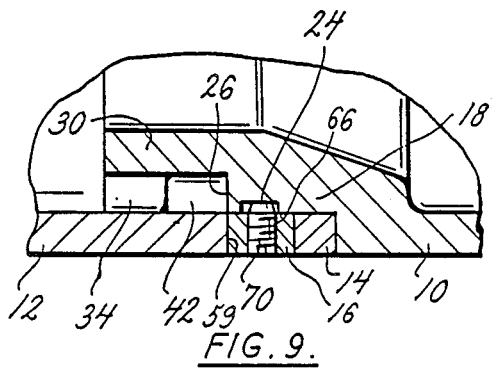

EXPANDING RING JOINT

BACKGROUND OF THE INVENTION

This invention relates to an apparatus and method for producing a rigid joint between two interlocked tubular members and in particular between two tubular members have cylindrical mating ends.

A variety of means have been employed to join mating members such as pipes or missile sections and to make the resulting joints secure. One such type of joint employs a Marmon Clamp. The disadvantages of this type of joint relate to the fact that it has projections which can interfere with the performance of the unit in which it is used and it does not provide the structural rigidity that is necessary for some applications. The Marmon Clamp also tends to flex and and has been known to cause fatigue problems. Another type of joint is the Radial Screw Joint. This joint tends to be less than rigid and, in fact, sloppy since tolerance levels are difficult to maintain during manufacturing. This results in a weakened joint which makes it inapplicable for certain applications. Another type of joint is the No-Lead Interrupted Threaded Joint. This joint is extremely expensive to manufacture. The expanding ring joint of the present invention provides the increased rigidity and reliability that the above discussed joints are unable to provide.

SUMMARY OF THE INVENTION

It is thus an object of the present invention to provide a Joint between two tubular members that is secure and reliable.

It is another object of the present invention to provide a joint with structural rigidity between two joined tubular members.

It is yet another object of the invention to provide a joint between two tubular members that can be easily assembled.

It is still another object of the present invention to provide a high integrity rigid joint between two tubular members using a minimum of individual parts.

And finally, it is an object of the present invention to provide a joint between two tubular members that provides the necessary rigidity and integrity characteristics without any structural protrusions external to the joint.

The joint of the present invention can be applied to any diameter tubular members. The expanding ring joint employs interlocking cogs located on the interfacing cylindrical ends of the two tubular members being joined, and two annular expansion rings, one on each side of the Joint interface extending around the cog ring on each side. One expansion ring may be integral to one cylindrical end, and thus immovable while the other is movable, or both rings may be movable. The two expansion rings permit the assembly of the structure necessitating the joint by permitting the engagement of the interlocking cogs before the joint is tightened and then made rigid by the interaction between the two expansion rings having a plurality of juxtaposed ramped surfaces, as one ring is turned relative to the other.

BRIEF DESCRIPTION OF THE DRAWINGS

FIG. 1 is an exploded perspective view of the invention.

FIG. 2 is a partial elevational view of the invention with the expansion rings in the closed condition.

FIG. 3 is a partial elevational view of the invention with the expansion rings in the open condition.

FIG. 4 is a partial elevational view of the separations between the ramps of the expansion rings.

FIG. 5 is a section view along plane 5—5 of FIG. 2.

FIG. 6 is a partial section view along plane 6—6 in FIG. 5.

FIG. 7 is a partial section view along plane 7—7 of FIG. 3.

FIG. 8 is a sectional view taken along plane 8—8 in FIG. 2.

FIG. 9 is a partial sectional view along line 9—9 of FIG. 8.

FIG. 10 is a partial sectional view along line 10—10 of FIG. 4 showing the alternative means of fixing the moveable expansion ring relative to the stationary expansion ring.

DETAILED DESCRIPTION

With reference to FIG. 1, a male tubular member 10 is shown with a mating female tubular member 12 and a stationary expansion ring 14 and movable expansion ring 16 which operatively interact annularly about the joint created by the coupling of said members.

The male tubular member 10 has an outer neck 18 extending axially from and normal to a flat annular lower shoulder 20 which contains an axially disposed retainer pin hole 22. The outer neck 18 extends to the flat annular upper shoulder 26. An annular channel 24 is disposed in the outer neck 18 between the lower shoulder 20 and the upper shoulder 26. The inner neck 30 extends axially upwards from and normal to the upper shoulder 26. A male interrupted lip 32 consists of a plurality of male cogs 34 which extend radially outward form the upper annular extremity of the inner neck 30. A threaded locking screw hole is radially disposed in and on the radial centerline of one or more of the male cogs 34.

The female tubular member 12 has a female interrupted lip 40 which consists of a plurality of female cogs 42 extending radially inward from one open end extremity of said member. A countersunk screw hole 46 is disposed axially inboard of one or more of the female cogs 42 for the purpose of receiving locking screw 50.

The stationary expansion ring 14 contains a continuous series of helical-shaped ramps 54 sloping upward axially from one end. The upper end of each ramp 54 terminates with an axially disposed end wall 56 which joins the lower end of the next ramp 54 in the series. The opposite end of the ring 14 is the flat surface 55 normal to the longitudinal axis of the ring. A retainer pin 58 extends upwards from and normal to the surface 55.

The moveable expansion ring 16 also contains a continuous series of helical-shaped ramps 54 sloping upward axially from one end. The upper end of each ramp 54 terminates with an axially disposed end wall 56 which joins the lower end of the next ramp 54 in the series. The opposite end of the ring 16 is the flat surface 57 normal to the longitudinal axis of the ring 16. A plurality of spaced adjustment holes 62 are radially disposed in the cylindrical wall of the ring 16, as are a plurality of spaced set screw holes 66 which accommodate set screws 70. The two rings 14 and 16 are typically fabricated from stainless steel or any other material meeting the desired strength requirements.

In use, the stationary expansion ring 14 is placed over the end of the male tubular member 10 about the outer neck 18 so that the flat surface 55 is in flush contact with the lower shoulder 20 when the retainer pin 58 is received in retainer pin hole 22, visible in FIGS. 1, 2, 3 and 8, to secure ring 14 from rotational movement. An Alternative embodiment employs only a movable expansion ring 16 in conjunction with a integral, fixed ring of mating ramps 54 machined to extend axially upward from the plane that otherwise contains the lower shoulder 20. The movable expansion ring 16 is next placed over the end of the male tubular member 10 about the outer neck 18 so that he ramps 54 of ring 16 are in full mating surface contact with the ramps 54 of said integral, fixed ring. The flat surface 57 of the movable expansion ring 16 will be facing towards the flat end surface 59 of the female tubular member 12 when the tubular members 10 and 12 are joined. The set screw holes 66 of movable expansion ring 16 overlay the annular channel 24 in the outer neck 18 of the male tubular member 10 when the ring is properly positioned.

Next, the male tubular member 10 is introduced into and Joined to the female tubular member 12 by passing the male cogs 34 of the male member 10 into the spaces between the female cogs 42 and then rotating the two tubular members 10 and 12 relative to each other until each male cog 34 is positioned behind and in contact with a corresponding female cog 42. Tubular members 10 and 12 are locked from further rotation relative to each other by means of one or more locking screws 50 being inserted through countersunk locking screw holes 46 in female tubular member 12 and threaded into locking screw holes 38 in the corresponding male cogs 34. The locking screw 50 relationship relative to the female tubular member 12 and the male cog 34 is shown in FIGS. 5 and 6. Thus assembled, as shown in FIG. 2, the mating ramps 54 and end walls 56 of each ramp of the expansion rings 14 and 16 are in full juxtaposition.

In order to eliminate any excess axial clearance and rigidize the Joint between the joined male tubular member 10 and female tubular member 12 the tips of a spanner wrench or equivalent tool are introduced into the adjustment holes 62 shown in FIGS. 1, 2, 3 and 8 in the movable expansion ring 16 clearly visible in FIGS. 2 and 3 so that the ring 16 can be rotated relative to the stationary expansion ring 14 or its integral, fixed equivalent. As the ring 16 is turned, the ramps 54 of rings 16 and 14 move upon each other causing the two rings to move axially apart, the ring 14 being pushed against the lower shoulder 20 of the male tubular member 10 and the ring 16 pushing against the flat end surface 59 of the female tubular member 12.

FIG. 3 shows the spaces 74 between the end walls 56 of the mating ramps 54 which result when the ring 16 is rotated relative to the ring 14. One or more set screws 70, as shown in FIGS. 1, 8 and 9 are introduced between movable expansion ring 16 and the annular channel 24 in the outer neck 18 of the male tubular member 10 in order to lock ring 16 from further movement relative to ring 14. In the alternative, as shown in FIGS. 4 and 10, filler 78 may be introduced into the spaces 74 to fix the rings 14 and 16 from further movement relative to each other. The filler 78 may be a liquid plastic or other material capable of being injected in a liquid state which will subsequently set up and become solid.

It will be understood from the foregoing that various changes in the embodiments of the invention are possible without departing from the spirit of the invention which is intended to be limited only by the scope of the claims which follow.

What is claimed is:

1. An apparatus for joining female and male tubular members along a common axis, comprising:
   a female tubular member having on one end a flat end surface and a female interrupted lip on said one end defining a plurality of inwardly projecting cogs;
   a male tubular member having a male interrupted lip on one end defining a plurality of outwardly projecting cogs sized and positioned to fit between and behind said inwardly projecting cogs when said male tubular member is axially aligned with said female tubular member, said male tubular member also defining a shoulder on said one end, said shoulder having an integral, stepped ramp surface extending axially therearound;
   a ring having a flat surface on one side and a stepped ramp surface on the other side, said ring being positioned around said one end of said male tubular member, said step ramp side abutting said stepped ramp surface integral to said shoulder;
   said female and male tubular members being axially aligned and engaged wherein said outwardly projecting cogs are behind said inwardly projecting cogs;
   means for holding said male tubular member against rotation relative to said female tubular member;
   means for rotating said ring relative to said stepped ramp surface integral to said shoulder so that said ring flat surface is in abutment with said flat end surface; and
   means for locking the rotational position of said ring relative to said male tubular member.

2. An apparatus for joining female and male tubular members along a common axis comprising:
   a female tubular member having on one end a flat end surface and a female interrupted lip on said one end defining a plurality of inwardly projecting cogs;
   a male tubular member having a male interrupted lip on one end defining a plurality of outwardly projecting cogs sized and positioned to fit between and behind said inwardly projecting cogs when said male tubular member is axially aligned with said female tubular member,
   said male tubular member also defining a lower shoulder on one end, an outer neck of lesser diameter than said lower shoulder extending upward, axially therefrom, upper shoulder extending radially inward therefrom, and a lesser diameter inner neck extending axially upward therefrom;
   a first ring having a flat surface on one side, and a stepped ramp surface on the other side, said first ring being positioned about said one end of said male tubular member, said flat side abutting said lower shoulder;
   a second ring having adjusting holes and a flat surface on one side, and a stepped ramp surface on the other side, said second ring being positioned about said one end of said male tubular member, said stepped ramp side abutting said stepped ramp of said first ring;
   means for retaining said first ring against rotation relative to said shoulder;
   said female and male tubular members being axially aligned and engaged wherein said outwardly projecting cogs are behind said inwardly projecting cogs;
   means for holding said male tubular member against rotation relative to said female tubular member;

means for rotating said second ring relative to said first ring so that said second ring flat surface is in abutment with said flat end surface; and means for locking the rotational position of said second ring relative to said male tubular member.

3. The apparatus of claim 2 wherein said means for holding said male tubular member against rotation relative to said female tubular member, comprises:

a plurality of axially disposed locking screw holes in said female tubular member centered between the radially disposed ends of and below said inward directed female cogs;

a plurality of threaded locking screw holes radially disposed through said outward directed male cogs and corresponding to said female member locking screw holes when said male and female members are joined and said male cogs lie below and behind said female cogs; and a plurality of locking screws disposed through said locking screw holes in said female tubular member and engaging the threaded locking screw holes in said male cogs.

4. The apparatus of claim 3 wherein said means for rotating said second ring relative to said first ring is a spanner or equivalent tool wrench for engaging the adjustment holes in said second ring.

5. The apparatus of claim 4 wherein said means for locking the rotational position of said second ring relative to said male tubular member, comprises:

an annular channel disposed in said outer neck between said lower shoulder and said upper shoulder in a plane normal to the longitudinal axis of said male tubular member;

a plurality of radially disposed threaded set screw holes spaced circumferentially about said second ring; and a plurality of set screws threaded within said set screw holes and extending into said annular channel.

6. The method of rigidly joining a female tubular member and a male tubular member, said female member having on one end a flat end surface and a female interrupted lip on said one end defining a plurality of inwardly projecting cogs and a plurality of radially disposed holes located below and centered on a line midway between the ends of at least two of said cogs, and said male member having a male interrupted lip on one end defining a plurality of outwardly projecting cogs sized and positioned to fit between and behind said inwardly projecting cogs, said male tubular member also defining an integral ring-shaped, stepped ramp surface including ramp end walls, said ramp surface extending axially upward about an outer neck of said male tubular member, an upper shoulder extending radially inward from said outer neck, and a lesser diameter inner neck extending axially upward from said upper shoulder, said method comprising the steps of:

introducing a ring having a flat surface on one side and a stepped ramp surface including ramp end walls on the other side upon said one end of said male tubular member with said ramp side abutting said integral stepped ramp surface of said male tubular member;

mating said male tubular member in said female tubular member so that said outward projecting cogs pass between said inward projecting cogs, and rotating said male tubular member relative to said female tubular member so that said outward projecting cogs are directly below and in slidable contact with said inward projecting cogs;

securing said mated male and female tubular members from further rotation relative to each other;

rotating said ring relative to said abutting integral stepped ramp surface extending axially upward about said outer neck of said male tubular member until said ring flat surface abuts said flat end surface and further rotation cannot be effected; and immovably fixing the position of said rotated ring relative to said abutting stepped ramp surface.

7. The method of rigidly joining a female tubular member and a male tubular member, said female member having on one end a flat end surface and a female interrupted lip on said one end defining a plurality of inwardly projecting cogs and a plurality of radially disposed holes located below and centered on a line midway between the ends of at least two of said cogs, and said male member having a male interrupted lip on one end defining a plurality of outwardly projecting cogs sized and positioned to fit between and behind said inwardly projecting cogs, said male tubular member also defining a lower shoulder on said one end, an outer neck of lesser diameter than said lower shoulder extending upward axially therefrom, an upper shoulder extending radially inward therefrom, and a lesser diameter inner neck extending upward axially therefrom, said method comprising the steps of:

introducing a first ring having a flat surface on one side and a stepped ramp surface including ramp end walls, each end wall extending from the top end of each preceding ramp to the bottom end of the next succeeding ramp, on the other side upon said one end of said male tubular member with said flat side abutting said lower shoulder;

securing said first ring immovably to said lower shoulder;

introducing a second ring having a flat surface on one side and a stepped ramp surface including ramp end walls on the other side upon said one end of said male tubular member with said stepped ramp side abutting said stepped ramp side of said first ring;

mating said male tubular member in said female tubular member so that said outward projecting cogs pass between said inward projecting cogs, and rotating said male tubular member relative to said female tubular member so that said outward projecting cogs lie directly below and in slidable contact with said inward projecting cogs;

securing said mated male and female tubular members from further rotation relative to each other;

rotating said second ring relative to said secured first ring upon said abutting first and second ring ramps until said second ring flat surface abuts said flat end surface and further rotation cannot be effected; and immovably fixing the position of said rotated second ring relative to said first ring.

8. The method of claim 7 wherein said step of securing said mated male and female tubular members from further rotation comprises the further steps of inserting a threaded fastener through said hole in said female tubular member; and advancing and seating said threaded fastener in a mating threaded hole in said outwardly projecting cog of said male tubular member, said threaded hole in said cog juxtaposed radially in line with said hole in said female tubular member.

9. The method of claim 8 wherein said threaded fastener is a metal screw.

10. The method of claim 9 wherein said hole in said female tubular member is countersunk to receive said metal screw flush with the surface of said member.

11. The method of claim 10 wherein said second ring has a plurality of radially disposed threaded holes and said outer neck of said male tubular member has an annular channel disposed below and in juxtaposition with said radially disposed holes in said ring.

12. The method of claim 11 wherein said step of immovably fixing the position of said rotated second ring relative to said first ring comprises the further step of threading a plurality of set screws into said thread holes until maximum engagement with said annular channel.

13. The method of claim 11 wherein said step of immovably fixing the position of said rotated second ring relative to said first ring comprises the further steps of:
 introducing a flowable plastic material into the space between the ramp end walls of said rings, and
 curing said plastic material to a solid state.

* * * * *